United States Patent

[11] 3,599,742

| [72] | Inventor | Jimmie L. Lowery<br>4005 W. Madison St., Bellwood, Ill. 60104 |
|---|---|---|
| [21] | Appl. No. | 845,732 |
| [22] | Filed | July 29, 1969 |
| [45] | Patented | Aug. 17, 1971 |

[54] ENGINE SHROUD FOR DUNE BUGGIES
8 Claims, 7 Drawing Figs.

[52] U.S. Cl. .................................................. 180/69 R
[51] Int. Cl. ....................................................... B62d 25/10
[50] Field of Search ............................................. 180/69, 54, 54.4, 69.1

[56] References Cited
UNITED STATES PATENTS

| 1,377,795 | 5/1921 | Armstrong | 180/69.1 |
| 2,227,142 | 12/1940 | Komenda | 180/69.1 |
| 2,262,467 | 11/1941 | Ormsby | 180/54 |

*Primary Examiner*—Benjamin Hersh
*Assistant Examiner*—Milton L. Smith
*Attorneys*—Clarence A. O'Brien and Harvey B. Jacobson ABSTRACT: A vehicle body rear closure for a rear engine "Dune Buggy" of the type provided with a chassis mounted abbreviated body structure and serving not only as a protective closure for the rear mounted engine of a "Dune Buggy," but also as a structure operative to control the flow of cooling air about the air-cooled engine of the vehicle whereby adequate cooling on hot days as well as heat retention on cold days is afforded. Further, the closure may also function as an engine skid plate. The closure includes first and second sections. The first section is constructed to be semipermanently attached to the associated "Dune Buggy" and includes opposite sidewalls interconnected at their bottom and lower rear marginal rear edge portions by means of integral bottom and partial lower rear walls, respectively. The second section defines an upper rear wall portion and includes opposite side and lower edge portions readily removably supported from the rear marginal edge portions of the sidewalls and the upper marginal edge portion of the partial lower rear walls, respectively, of the first section for ease in servicing the engine of the vehicle.

PATENTED AUG 17 1971

Jimmie L. Lowery
INVENTOR.

BY *Clarence A. O'Brien*
*and Harvey B. Jacobson*
Attorneys

PATENTED AUG 17 1971
3,599,742
SHEET 2 OF 2
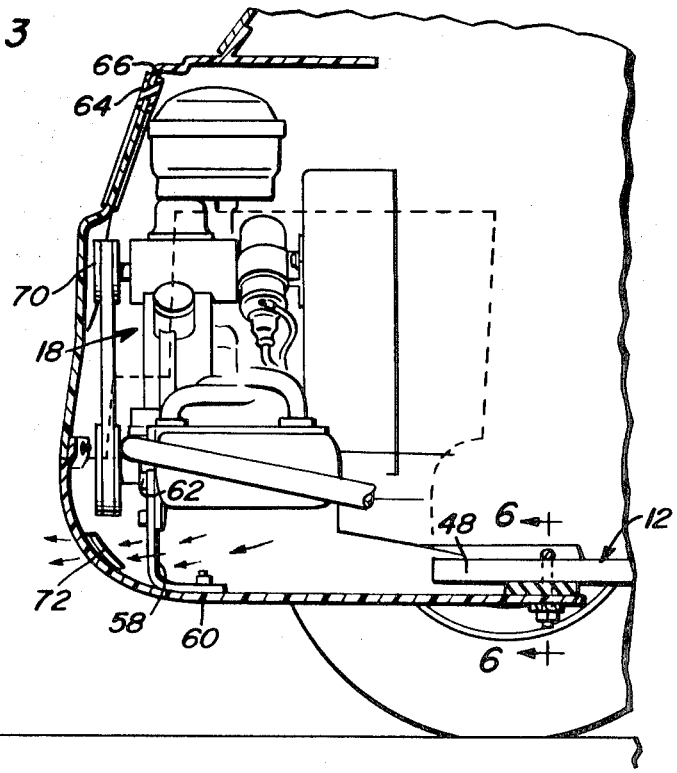
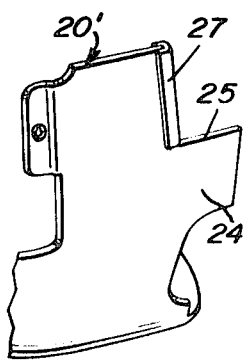
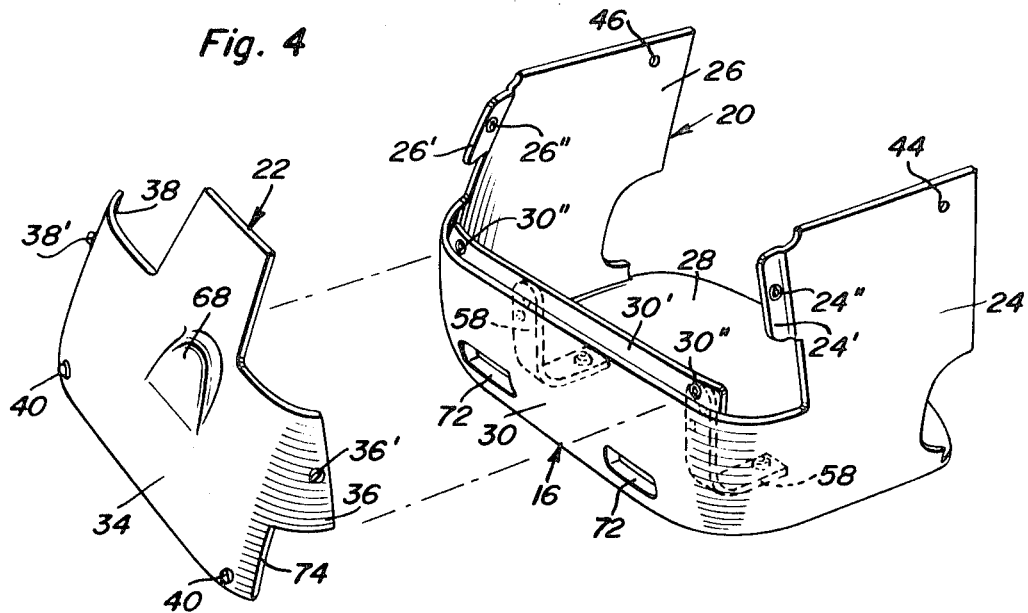
Jimmie L. Lowery
INVENTOR
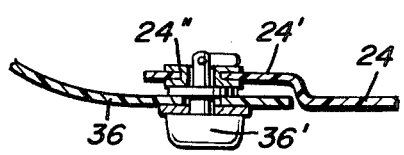

ENGINE SHROUD FOR DUNE BUGGIES

The shroud is intended for use on "Dune Buggy" vehicles, where the motor is exposed, uncovered and unprotected as is the general case. A "Dune Buggy" is usually based upon a modified Volkswagen chassis which has been shortened and which has an abbreviated body structure mounted thereon.

There are many manufacturers who presently market bodies of various shapes for mounting on modified Volkswagen chassis but very few of these bodies include portions thereof which enclose the rear engine of the associated vehicle.

The engine shroud is designed not only to provide protection for the "Dune Buggy" engine but also to assist in the control of flow of cooling air around the air-cooled Volkswagen engine and to enclose various moving parts in order that curious onlookers and bystanders will not inadvertently be injured. In addition, the engine shroud serves to enclose those portions of the engine which become heated during operation of the engine and which might severely burn an onlooker or bystander. Also, the engine shroud offers protection against access to the normally exposed engine of the "Dune Buggy" and thereby discourages theft of engine accessories as well as the "Dune Buggy" itself.

The engine shroud may be readily constructed of sheet metal, Fiberglas, and any other suitable materials. Further, by minor changes in the readily removable portion of the shroud it may be adapted to virtually all "Dune Buggy" bodies and its construction is such that it can be readily expanded in width as well as length so as to accommodate larger engines. Finally, as "Dune Buggies" become increasingly popular, state motor vehicle commissions are placing restrictions against "Dune Buggies" denying them licensing for highway operation unless they are provided with suitable lighting and in some cases wraparound bumpers and extended fender portions for enclosing the wheels of the "Dune Buggy." It is believed that it is just a matter of time before regulatory agencies for vehicles also require that the engines thereof be at least substantially enclosed.

It is accordingly the main object of this invention to provide an engine shroud for "Dune Buggies" which will function to at least substantially fully enclose the engine of the "Dune Buggy."

Another object of this invention, in accordance with the immediately preceding object, is to provide an engine shroud constructed in a manner whereby it may be readily adapted for use on substantially all "Dune Buggy" bodies.

Still another object of this invention is to provide an engine shroud including a readily removable panel thereof for access to the engine to be enclosed by the shroud.

A further object of this invention is to provide an engine shroud in accordance with the preceding objects which will also serve to control the flow of cooling air over the air-cooled engines of "Dune Buggies."

A final object of this invention to be specifically enumerated herein is to provide an engine shroud for "Dune Buggies" which will conform to conventional forms of manufacture, be of simple construction and easy to install so as to provide a device that will be economically feasible, long lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged fragmentary vertical sectional view taken substantially upon the plane indicated by the section line 3-3 of FIG. 1;

FIG. 4 is an exploded perspective view of the engine shroud minus its mounting components;

FIG. 5 is an enlarged fragmentary horizontal sectional view taken substantially upon the plane indicated by the section line 5-5 of FIG. 2;

FIG. 7 is a fragmentary perspective view of one side of a modified form of engine shroud illustrating the manner in which at least one corner portion of the shroud may be modified for mounting on different "Dune Buggies."

Figure 1:
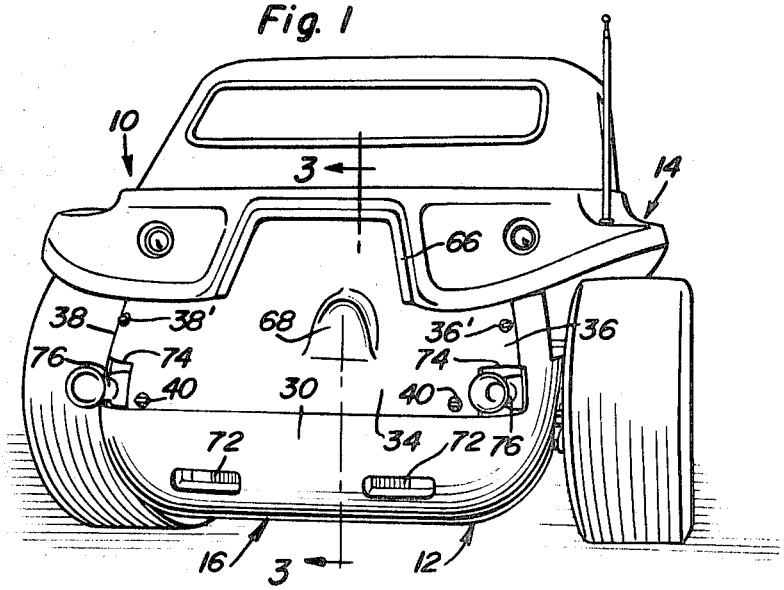
FIG. 1 is a rear elevational view of a "Dune Buggy" with the engine shroud of the instant invention applied thereto.

Referring now more specifically to the drawings, the numeral 10 generally designates a "Dune Buggy" including a modified chassis referred to in general by the reference numeral 12 and a "Dune Buggy" body generally referred to by the reference numeral 14.

Figure 2:
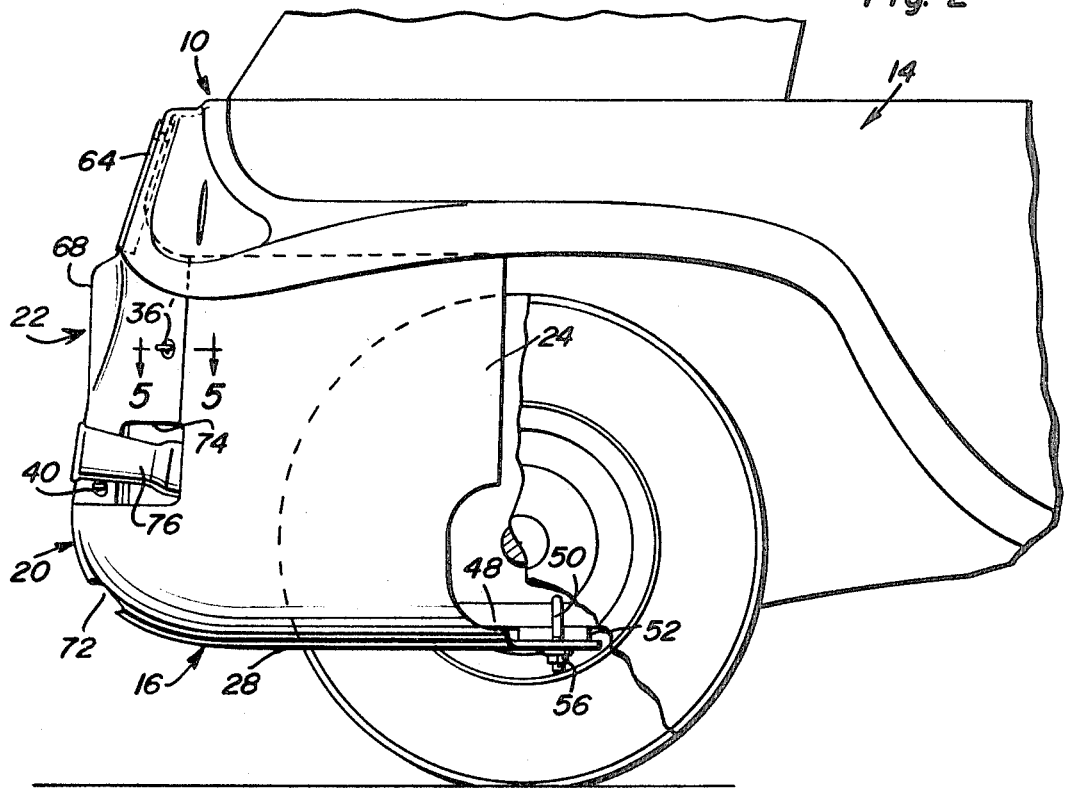
FIG. 2 is a fragmentary enlarged elevational view of the rear portion of the "Dune Buggy" illustrated in FIG. 1 with portions of the near side wheel of the "Dune Buggy" being broken away.
Figure 6:
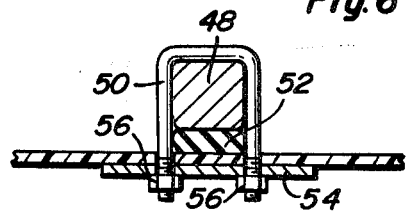
FIG. 6 is an enlarged fragmentary transverse vertical sectional view taken substantially upon the plane indicated by the section line 6-6 of FIG. 3.

The engine shroud of the instant invention is generally referred to by the reference numeral 16 and may be seen in FIGS. 1 and 2 of the drawings to be applied to the rear end of the "Dune Buggy" 10 in order to enclose the Volkswagen engine referred to in general by the reference numeral 18, see FIG. 3, which powers the "Dune Buggy" 10.

The engine shroud includes a first section 20 and a second section 22. The section 20 includes opposite sidewalls 24 and 26 interconnected by means of a bottom wall 28 as well as a lower rear wall portion 30. The lower and rear marginal edge portions of the sidewalls 24 and 26 curve smoothly into the bottom wall 28 and the lower rear wall portion 30 and the rear marginal edge portions of the sidewalls 24 and 26 include inwardly offset rearwardly projecting mounting tabs 24' and 26' having grommets 24" and 26" secured therethrough. In addition, the upper marginal edge portion of the lower rear wall portion 30 includes an inwardly offset upwardly projecting mounting tab 30' having grommets 30" secured therethrough.

The second section 22 of the shroud 16 includes an upper rear wall portion 34 including forwardly curving opposite side portions 36 and 38 which have quick release fasteners 36' and 38' journaled therethrough. In addition, the lower marginal edge portion of the section 22 includes quick release fasteners 40 rotatably journaled therethrough. The fasteners 36', 38' and 40 are releasably securable through the grommets 24", 26" and 30" in order to releasably secure the second section 22 across the open rear portion of the first section 20.

The forward upper corners of the sidewalls 24 and 26 are apertured as at 44 and 46, respectively, for securement of the upper forward corners of the sidewalls 24 and 26 to the "Dune Buggy" body 14 by means of suitable fasteners (not shown). Further, the forward marginal edge portion of the bottom wall 28 is secured to a pair of longitudinal engine mounts 48 of the "Dune Buggy" 10 by means of U-clamps 50 securing the front marginal edge portion of the bottom wall 28 to the engine mounts 48 with resilient pads 52 disposed between the opposing surfaces of the bottom wall 28 and the engine mounts 48. In addition, reinforcing backing plates 54 are utilized beneath the bottom wall 28 through which the threaded ends of the U-clamps 50 are secured by means of their fasteners 56.

From FIGS. 3 and 4 of the drawings it may be seen that a pair of L-shaped brackets 58 may be secured to the bottom wall 28 by means of suitable fasteners 60 and that the brackets 58 may be secured to rear portions of the corresponding heads of the engine 18 by means of suitable fasteners 62. Further, the upper central portion of the section 22 has a seal strip 64 supported therefrom which interlocks with the corresponding marginal edge portion 66 of the body 14. Also, the section 22 includes a small bubble 68 to provide clearance for the generator pulley 70 of the engine 18 and suitable openings 72 may be cut in the section 20 to assist in the discharge of air passing about the cylinder heads of the engine 18. Finally, the lower corners of the section 22 may be cut away as at 74 in order to provide openings for engine exhaust pipes 76.

With attention now invited more specifically to FIG. 7 of the drawings there will be seen a modified form of engine shroud section referred to in general by the reference numeral 20' and which comprises a substantial duplicate of the section 20 except that the forward upper corners of the sidewalls 24 thereof are cut away as at 25 and provided with a resilient edging 27 so as to adapt the section 20' for use in conjunction with a different "Dune Buggy" body.

As hereinbefore set forth, the sections 20 and 22 of the engine shroud 16 may be constructed of Fiberglas, sheet metal or other suitable materials. In addition, fasteners other than fasteners 36', 38' and 40 may be utilized to secure the second section 22 to the first section 20 and the shroud may be readily utilized in conjunction with a "Dune Buggy" provided with an engine skid plate, the skid plate being disposed above the bottom wall and to which the bottom wall 28 of the shroud 16 may be secured, if desired. Finally, the shroud 16 may, itself, comprise an engine skid plate by securing the rear marginal edge portion of a suitable generally horizontal and forwardly and upwardly inclined metal plate beneath the forward edge portion of the bottom wall 28 and the forward marginal edge portion of the plate to an adjacent chassis portion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle body rear closure for a rear engine vehicle of the type provided with an abbreviated body structure, said closure including a body section including upstanding opposite sidewalls interconnected at their lower marginal portions by means of a bottom wall and at their rear marginal portions by a rear wall, whereby the body section defines a forward and upwardly opening structure for support beneath and at the rear of said vehicle with the bottom and rear walls disposed below and behind the engine of said vehicle, respectively, and the sidewalls embracingly receiving the engine therebetween, said rear wall being vertically short relative to its horizontal extent between said sidewalls and the upper marginal edge portion of said rear wall being disposed appreciably below the upper marginal edge portions of said sidewalls, said closure further including an upstanding closure panel, the lower and upstanding marginal edge portions of said closure panel and the upper marginal edge of said rear wall and the rear marginal edge portions of the portions of said sidewall projecting above said rear wall including coacting means removably supporting said closure panel from said body section for disposition behind the upper portions of the engine of said vehicle.

2. The combination of claim 1 wherein said body section is constructed of a material which is rigid and which may have smoothly finished openings formed therein for airflow therethrough and the passage of exhaust pipes therethrough.

3. The combination of claim 1, wherein said coacting means includes readily releasable fasteners carried by said closure panel and engageable with said body section.

4. The combination of claim 1, wherein said coacting means includes inwardly offset mounting tabs carried by said body section over which the adjacent portions of said closure panel are lapped.

5. The combination of claim 1, wherein said coacting means includes inwardly offset mounting tabs carried by said body section over which the adjacent portions of said closure panel are lapped, said adjacent portions of said closure panel including rotatable fasteners releasably securable through said mounting tabs.

6. The combination of claim 1, wherein the adjacent edge portions of said bottom, rear and sidewalls are curved so as to merge smoothly with each other.

7. In combination with a rear engine vehicle of the type including an abbreviated body structure devoid of sections thereof enclosing the engine of said vehicle from beneath, both sides and from the rear, a closure including a body section defining upstanding opposite sidewalls interconnected at their lower marginal portions by means of a bottom wall and at their rear marginal portions by means of a rear wall, said closure being supported from said engine and body with the bottom and rear walls disposed and extending transversely below and behind the engine, respectively, between and with sidewalls embracingly receiving the engine therebetween, said rear wall being vertically short relative to its horizontal extent between said sidewalls and the upper marginal edge portion of said rear wall being disposed appreciably below the upper marginal edge portions of said sidewalls, said closure further including an upstanding closure panel, the lower and upstanding marginal edge portions of said closure panel and the upper marginal edge of said rear wall and the rear marginal edge portions of the portions of said side walls projecting above said rear wall including coacting means removably supporting said closure panel from said body section for disposition behind the upper portions of the engine of said vehicle.

8. The combination of claim 7, wherein said coacting means includes inwardly offset mounting tabs carried by said body section over which the adjacent portions of said closure panel are lapped.